(12) United States Patent
Baston

(10) Patent No.: US 9,974,408 B2
(45) Date of Patent: May 22, 2018

(54) PORTABLE HOT BEVERAGE MAKER OR TUMBLER WITH PASSIVE COOLING SYSTEM

(71) Applicant: Pierre Maurice Baston, Philadelphia, PA (US)

(72) Inventor: Pierre Maurice Baston, Philadelphia, PA (US)

(*) Notice: Subject to any disclaimer, the term of this patent is extended or adjusted under 35 U.S.C. 154(b) by 234 days.

(21) Appl. No.: 14/642,177

(22) Filed: Mar. 9, 2015

(65) Prior Publication Data

US 2015/0250346 A1    Sep. 10, 2015

Related U.S. Application Data

(60) Provisional application No. 61/949,736, filed on Mar. 7, 2014.

(51) Int. Cl.
```
A47J 31/00      (2006.01)
A47J 41/00      (2006.01)
A47J 42/54      (2006.01)
```

(52) U.S. Cl.
CPC ......... *A47J 31/005* (2013.01); *A47J 41/0038* (2013.01); *A47J 42/54* (2013.01)

(58) Field of Classification Search
CPC ....... A47J 31/005; A47J 42/54; A47J 41/0038
See application file for complete search history.

(56) References Cited

U.S. PATENT DOCUMENTS

| | | | |
|---|---|---|---|
| 4,674,400 A | 6/1987 | Rondel et al. | |
| 4,721,035 A | 1/1988 | Chang-Diaz | |
| 5,218,667 A | 6/1993 | Martin | |
| 5,233,914 A | 8/1993 | English | |
| 5,518,142 A | 5/1996 | Lin | |
| 5,778,765 A | 7/1998 | Klawuhn et al. | |
| 6,460,735 B1 | 10/2002 | Greenwald et al. | |
| 6,564,975 B1 | 5/2003 | Garman | |
| 6,948,421 B2 | 9/2005 | Meador | |
| 6,997,104 B1 | 2/2006 | Lin | |
| 8,467,670 B2 | 6/2013 | Baston | |
| 2003/0070430 A1 | 4/2003 | Beckius et al. | |
| 2006/0102010 A1 | 5/2006 | Burrows | |

FOREIGN PATENT DOCUMENTS

GB    1395507 A    5/1975

OTHER PUBLICATIONS

Author Unknown,Mate a Mate Nuevo y Exclusivo Termo / Mate, http://mateamate.com.ar/,Copyright 2003 / 2008—Mate a Mate, Argentina/Brazil/Uruguay.
Contigo,The Autoseal West Loop Travel Mug,http://www.gocontigo.com/ website, Copyright 2009 gocontogo.com, Chicago, IL, US.

*Primary Examiner* — Sean Michalski
(74) *Attorney, Agent, or Firm* — Boag Law, PLLC

(57) ABSTRACT

A travel mug that maintains its liquid contents at temperature while cooling portions of the beverage on demand to a safe and comfortable drinking temperature. In embodiments, a passive cooling system is integrated into the travel mug for drawing heat from the beverage as the user consumes it. In embodiments, a brewing system may be integrated to brew beverage matter into a drinkable beverage. In embodiments, a heating element may be provided to raise water to brewing temperature or to further heat the liquid in the container.

21 Claims, 6 Drawing Sheets

PORTABLE HOT BEVERAGE MAKER OR TUMBLER WITH PASSIVE COOLING SYSTEM

CROSS-REFERENCE TO RELATED APPLICATION

This application claims benefit of priority of U.S. Provisional Application Ser. No. 61/949,736 titled, "PORTABLE HOT BEVERAGE MAKER OR TUMBLER WITH PASSIVE COOLING SYSTEM," filed on Mar. 7, 2014, the content of which is incorporated by reference herein in its entirety.

FIELD

The present invention relates generally to a travel mug, and more particularly to a travel mug with a built-in brewing apparatus and/or cooling mechanism.

SUMMARY OF THE INVENTION

In embodiments of the invention, a travel mug is disclosed comprising an outer sidewall portion defining a container for holding a liquid and a brewing cup formed at the base of the container. A valve may be positioned within the container so as to divide the container into a water tank and a brewing receptacle, and a valve may be attached to the valve button via a valve rod. A beverage channel may be provided for communicating fluid from the brewing receptacle to the exterior of the device, and a passive cooling mechanism may be integrated adjacent a portion of the beverage channel. In alternate embodiments, a passive cooling mechanism may be integrated into the base of the device, near the brewing receptacle.

In embodiments, the passive cooling mechanism may further include a ventilation channel. In further embodiments, the beverage channel may be configured to increase the surface area for heat transfer, and may be positioned adjacent at least one compartment containing a phase change material. In further embodiments, the beverage channel or phase change material compartment is exposed to an outer sidewall. In embodiments, a dosing valve may dispense a set quantity of liquid into the brewing cup. A heating element may also be provided, and may be powered by any of an internal battery, an AC power source, or a DC power source.

In alternative embodiments, the brewing cup may be omitted and the invention comprises an outer sidewall portion defining a container for holding a liquid, a beverage channel for communicating fluid to the exterior of the device, and a passive cooling mechanism adjacent a portion of the beverage channel.

BACKGROUND

Travel mugs of the prior art come in a variety of styles and configurations, but most, if not all, are designed to retard the natural cooling of the liquid so that the user may enjoy a hot beverage longer than would otherwise be possible. Existing mugs use various materials, lids, vacuum chambers, and the like to maintain the temperature.

Because of the potentially elevated temperatures of the liquids held in mugs of the prior art, a user must generally wait for the beverage to cool before consuming, or risk injury.

Devices in the prior art have attempted to address this problem through various means. For example, some other devices cool hot beverages within cup or mug by separating a portion of the drink in the lid. However, these devices are lacking in several respects. First, they may not be effective enough to cool beverages from the highest possible temperature (212° F.) to the temperature range widely regarded as truly safe (136° F.). Second, they may fail even to cool beverages to the devices' maximum capacity from the very first sip, but may become more effective only with subsequent sips. Third, they are inconvenient to use, requiring the user to tip the cup more and more with each successive sip.

Alternative methods employ phase change material (PCM) encased in metal capsules that cool hot beverages when immersed in liquid. However, these devices require a wait (5 minutes, per instructions) for the product to absorb the beverage's heat, and cool the entire contents of the cup or mug into which they are inserted at the same time, meaning the consumer must rush to finish drinking quickly once the beverage has reached target temperature. These capsules also take up space inside the mug and significantly reduce the volume of beverage itself that the mug can carry.

Accordingly, what is needed is a thermal beverage container that rapidly cools the liquid as the user drinks from the container, without significant initial waiting or significant waiting between subsequent sips.

What is further needed is a thermal beverage container that cools the liquid to a safe drinking temperature from the initial sip.

What is further needed is a thermal beverage container that cools the liquid without requiring progressively more uncomfortable tipping to cool the liquid, and permits consumption using a straw.

What is further needed is a thermal beverage container that cools only the amount of beverage being consumed at the moment, and leaves the remainder hot, so the user can finish the contents of his tumbler at satisfying temperature at his leisure.

What is still further needed is a thermal beverage container that brews and cools South American mate or tea in the Chinese gongfu style. The mate and gongfu practices require brewing a small quantity of beverage at a time (e.g., 1-2 oz.), drinking it, and then repeating multiple times, until a full beverage serving is consumed. Since the ideal brewing temperature of mate and tea is higher than the safe drinking temperature, what is needed is a thermal beverage container that cools beverage in discrete portions, immediately after each portion is brewed, while leaving the unused water for brewing still hot.

Lastly, what is needed is a thermal beverage container that is volumetrically efficient and substantially maximizes the amount of volume available for liquid within the device.

BRIEF DESCRIPTION OF THE DRAWINGS

The features and advantages of the disclosure will be more fully understood with reference to the following description of exemplary embodiments of the invention when taken in conjunction with the accompanying figures, which are a graphical representation of the salient elements of the present invention.

DESCRIPTION

In embodiments, a portable, spill-proof travel mug is disclosed that enables a user to enjoy his favorite hot beverage at a safe and comfortable drinking temperature. In certain embodiments of the invention, a travel mug is disclosed that permits the user to fill the unit with a hot beverage already made. In alternative embodiments of the invention, a hot beverage may be brewed in the unit, with hot water in one compartment and brewing ingredients (e.g., tea leaves or ground coffee) in another so that later, the user can brew a beverage on the spot and at the moment of consumption for freshest flavor.

Figure 1:
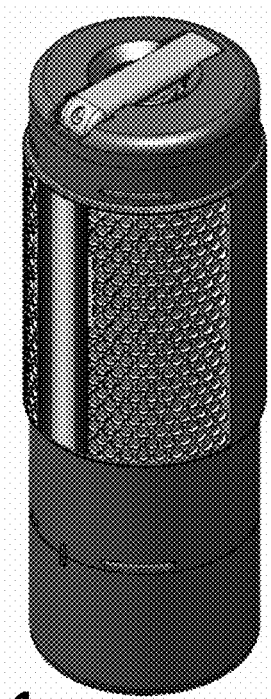
FIG. 1 is a perspective view of a travel mug according to an embodiment of the present invention.
Figure 2:
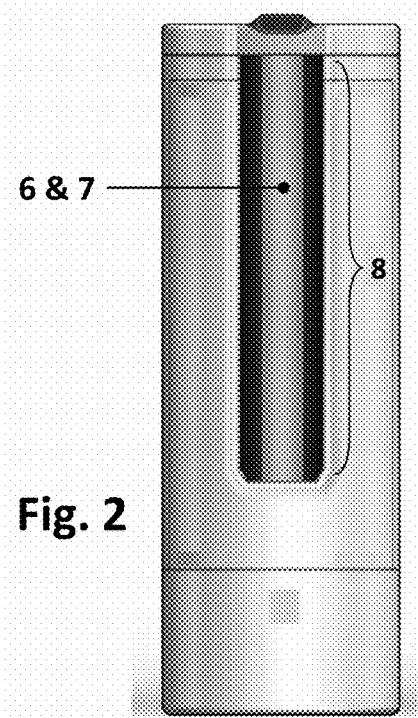
FIG. 2 is a front view of a travel mug according to an embodiment of the present invention.

FIG. 1 shows an exterior view of an embodiment of the invention, while FIG. 2 shows the exterior front view of this embodiment. In embodiments, travel mug may be generally cylindrical in shape, and of about the same height and diameter as a typical 1-liter thermos bottle. It will be appreciated by those of skill in the art that the device of the present invention may take on various sizes and configurations that depend on the needs of the individual user. The views in FIGS. 1 and 2 show the device with a mouthpiece in the closed position for leak-proof transport when the device is not in use.

Figure 3:
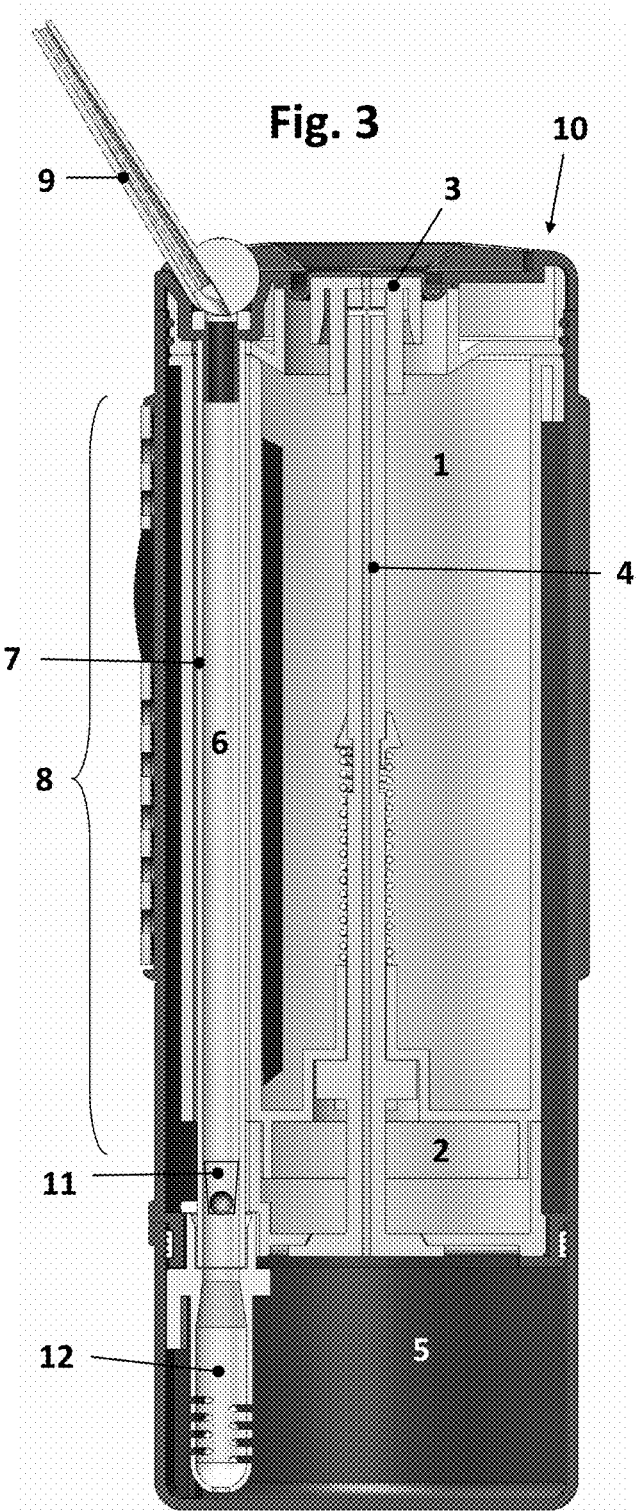
FIG. 3 is a cutaway side view of a travel mug according to an embodiment of the present invention.

Referring to FIG. 3, a vertical cross section of an embodiment of the present invention is disclosed. In embodiments, a water tank 1 and a detachable brewing cup 5 may be separated by a dosing valve 2. Dosing valve 2 may be actuated by a valve rod 4, which in turn may be actuated by downward pressure on valve button 3. Valve button 3 may be covered by a flexible membrane that keeps the device watertight and spill-free. Valve button 3 and mouthpiece 9 are part of cap assembly 10, which can be detached as a single piece when the user wishes to fill water tank 1 with water.

In embodiments, dosing valve 2 is in a normally open position with regard to water tank 1, and in a normally closed position with regard to brewing cup 5 below it. When actuated, dosing valve 2 may release a quantity of water necessary for a single beverage portion—approximately 1.5 oz.—and then close again. The amount of water released by dosing valve 2 is determined by the volumetric capacity of the reservoir within the valve.

To prepare the device for use, the user may first detach cap assembly 10 from the main body portion and fill water tank 1 with hot water for brewing. User may then detach brewing cup 5 from the main body and fill the cup with tea leaves or other brewing material. Detachable filter tube 12 may then be inserted into the leaves and anchored to the edge of brewing cup 5. Then the brewing cup is reattached to the main body, with index marks on the pieces aligned so as to connect filter tube 12 and beverage tube 6. The device is now ready for use, and can be tossed into handbag, briefcase or backpack for use later "on the go."

When ready to brew and drink, the user unfolds mouthpiece 9 and pushes valve button 3 to transfer 1.5 oz. of hot water into brewing cup 5. There, the water infuses the tea leaves for the steeping time the user prefers. The user can then draw on mouthpiece 9 to draw the freshly brewed, still-hot tea beverage up through filter tube 12 into beverage tube 6 and the passive cooling system, where it is cooled to 136 F. As the user continues to draw, the cooled beverage passes through the mouthpiece and into his mouth.

When ready, the user repeats the process by pushing valve button 3 to release another dose of water to infuse the tea leaves in brewing cup 5 again. The process can continue until all of the water in water tank 1 has been used, or until the flavor of the tea leaves in brewing cup 5 has been exhausted. This capacity to steep leaves repeatedly in small quantities of about 1-2 oz. to produce a gradually evolving flavor experience is highly valued in the South American mate and Chinese gongfu tea traditions.

In a preferred embodiment, the cooling system of the present invention may include: (1) heat-absorbing phase change material (PCM) contained within a compartment in contact with the beverage tube, and (2) a space, void or channel allowing the ambient air around the device to flow across both the inward and outward surfaces of the PCM compartment and/or beverage tube to facilitate quickest cooling.

FIGS. 1-3 show beverage tube 6 as a simple tube, and imply that the compartment containing the PCM 7 is tubular also and wrapped around the beverage tube, and also that ventilation space 8 for heat transfer between PCM and ambient air is cylindrical or ovoid. However, the exact shapes, dimensions and configurations of the elements encompassed by this invention are infinitely variable, and could include without limitation such devices to facilitate heat transfer as convoluted fin stock, inline static mixers, dimples, fins, pins, etc. The cooling system could be open to the ambient air directly, or through a porous grill, or through discrete ports or slots, among many possibilities. In some embodiments, slides, louvers, or other mechanisms may enable the user to partially or totally open or close these ventilation orifices in order to adjust the final temperature of the beverage, or to compensate for extreme ambient conditions.

Final beverage temperature may also be controlled by a mechanism permitting selection between alternative PCM compartments containing different PCMs with different thermal characteristics, or by employing multiple PCM varieties in tandem. Also, the system may include no PCM at all, and may rely on the cooling effect of the ambient environment on the exposed beverage tube alone. The system may also provide no interior ventilation space, and may rely on cooling from exposure of only the outward surfaces of the PCM compartment and/or beverage tube.

In embodiments, the cooling system will allow a user to draw 1.5 oz. of beverage through beverage tube 6 and out of mouthpiece 9 without pause, and will cool the beverage to 136 F. instantly as it passes through. In less efficient configurations, the hot beverage may need to be exposed to PCM compartment 7 and ventilation space 8 longer in order to cool all of the way to target temperature. Those configurations may deploy a one-way check valve 11 to hold hot tea in place in beverage tube 6 for the few seconds that may be needed for complete cooling.

To keep to a compact size, preferred embodiments will deploy only enough PCM to absorb the heat of a single 1.5-oz. dose of tea being cooled from 212 F. to 136 F. (approximately 1 oz. of PCM). After cooling one dose of tea, the PCM (now melted) will itself need time to cool and re-solidify before cooling the next dose. This PCM recovery takes place while the consumer is savoring the flavor of the tea he has just brewed. For most tea drinkers, and especially those who admire the gongfu style, appreciative drinking with pauses between sips is desirable.

Alternative embodiments may deploy enough PCM to cool the entire contents of the device without recovery pauses.

It should be noted that while various embodiments discuss specific beverage types, the present invention is not limited to tea, coffee or mate, or indeed beverages that are brewed. The embodiments of the present invention can conceivably be utilized with any hot beverage for consumption.

Figure 4:
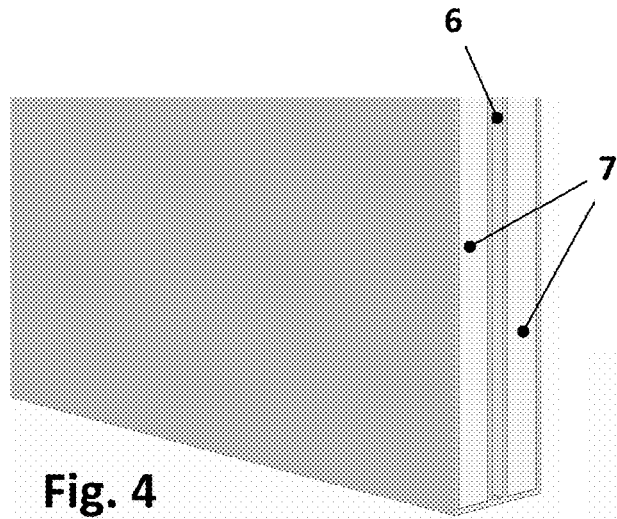
FIGS. 4-6 show an alternative embodiment as illustrated with a modified cooling system.
Figure 5:
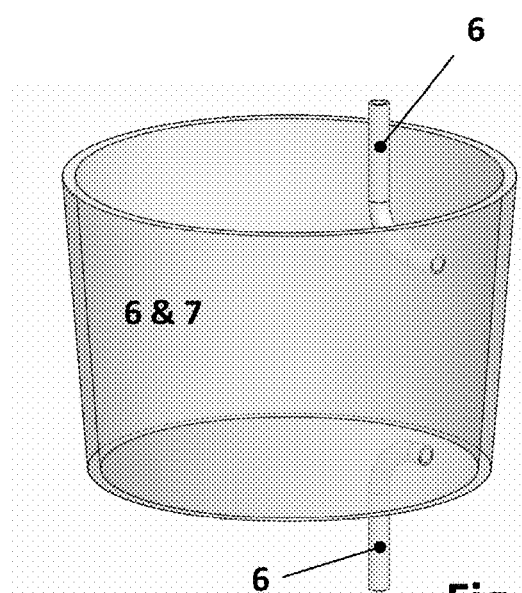
Figure 6:
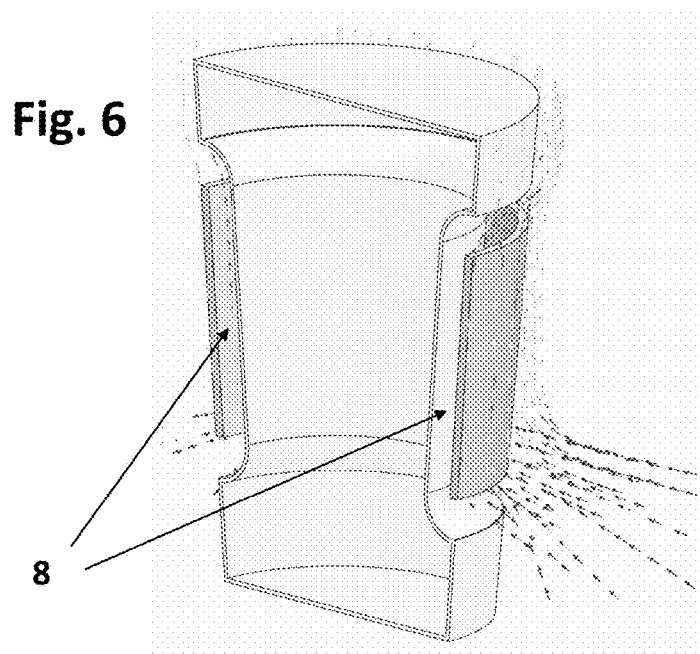

Referring to FIGS. 4-6, an alternative embodiment is illustrated in which the cooling efficiency of the system may be enhanced by modifying the beverage tube. In embodiments, beverage tube 6 is deformed (e.g., flattened or stretched) into a planar beverage channel 6, to maximize the area for heat transfer between it and the PCM compartments 7 sandwiching it. The planar cooling sandwich (6, 7) may be wrapped around the exterior of the device, and the ventilation space 8, accordingly, may also be planar in form and wrap around the device to cool the interior side of the cooling unit.

Figure 7:
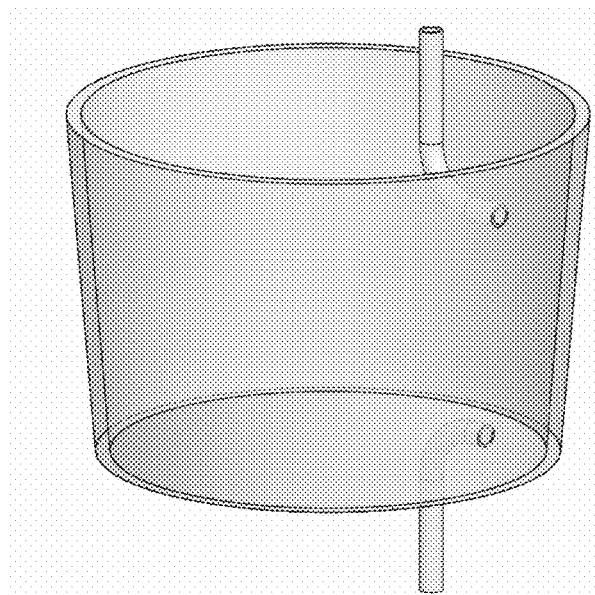
FIG. 7 shows a further alternative embodiment with a modified cooling system.
Figure 7A:
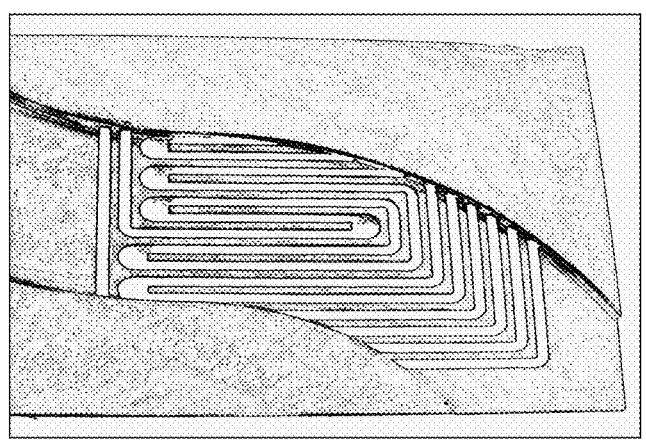

Referring to FIG. 7, beverage channel 6 may have a zig-zag or labyrinthine beverage track that can direct the beverage back and forth across the entire heat-transfer surface, as the beverage travels from the bottom of the cooling unit to the top. The beverage track may be either carved into one of the beverage channel walls, or formed by dividers projecting from one of the walls.

Figure 8:
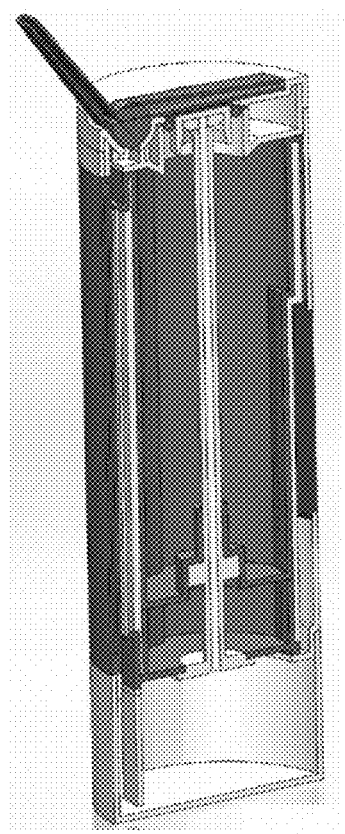
FIGS. 8-10 show a further alternative embodiment with a modified cooling system.
Figure 9:
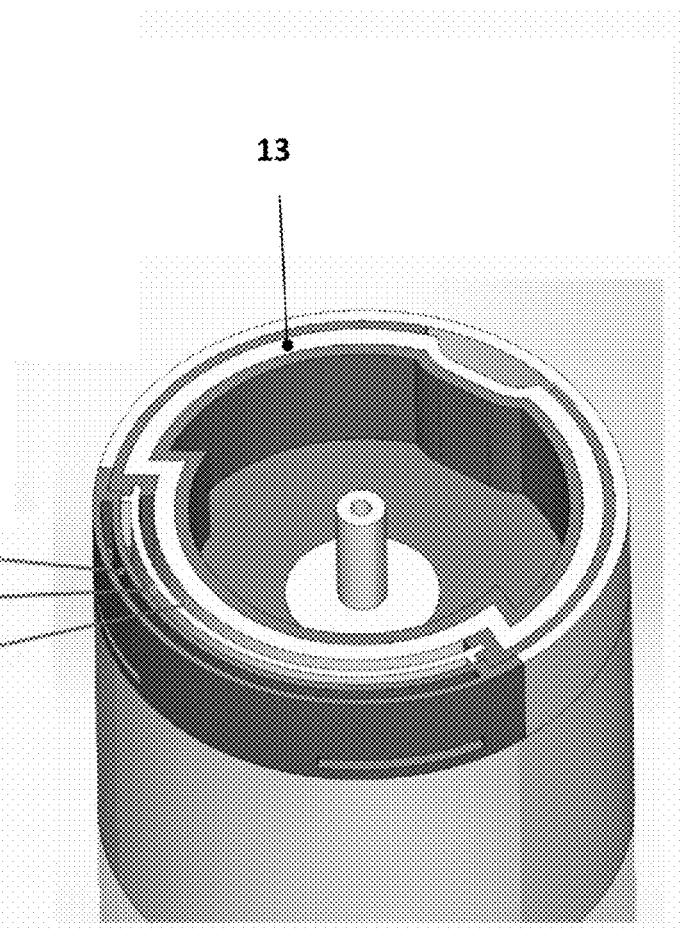
Figure 10:
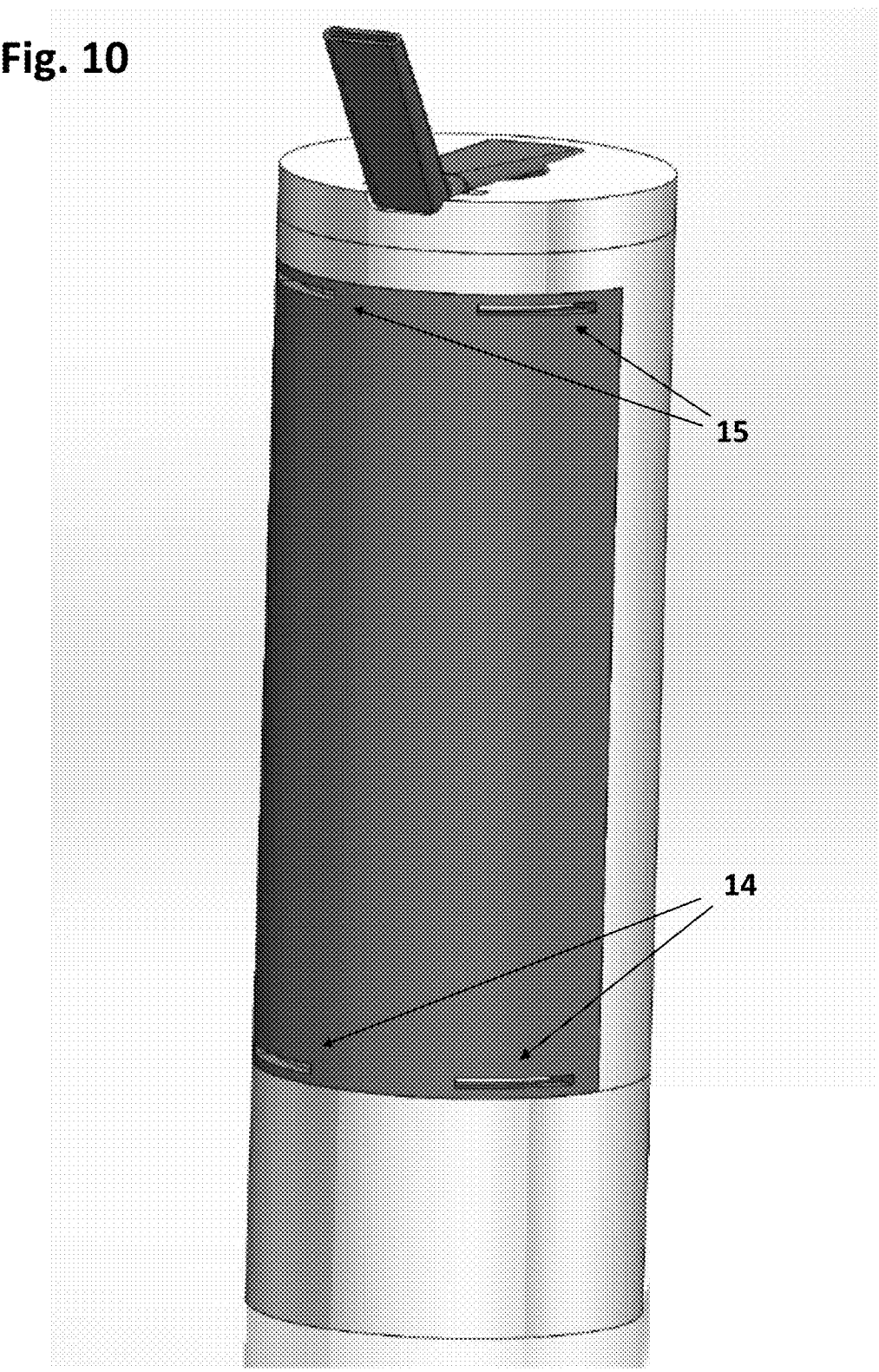

Referring to FIGS. 8-10, a further alternative embodiment is described in which the planar sandwich of FIGS. 4-6 has been simplified to a single outer PCM compartment 7 and beverage channel 6. In this embodiment, beverage channel 6 may be defined by the inner wall of PCM compartment 7 on one side, and the outer wall of ventilation channel 8 on the other side. In some variations of this embodiment, a tank assembly consisting of water tank 1, valve rod 4 and dosing valve 2 may be detachable from the device's outer shell in order to facilitate cleaning of tank and valve. Such an arrangement would also separate the walls forming beverage channel 6, and expose the entirety of the beverage channel's inner surfaces for easy cleaning.

In further embodiments, PCM compartment 7 may be easily detachable from the device's main body for the same benefits of easy cleaning of beverage channel 6. FIGS. 8-10 illustrate an embodiment in which PCM compartment 7, beverage channel 6, and ventilation channel 8 only wrap partly around the exterior, rather than completely around. Referring to FIG. 10, inlet slots 14 and outlet slots 15 are shown as leading to and from interior ventilation space 8.

Figure 11:
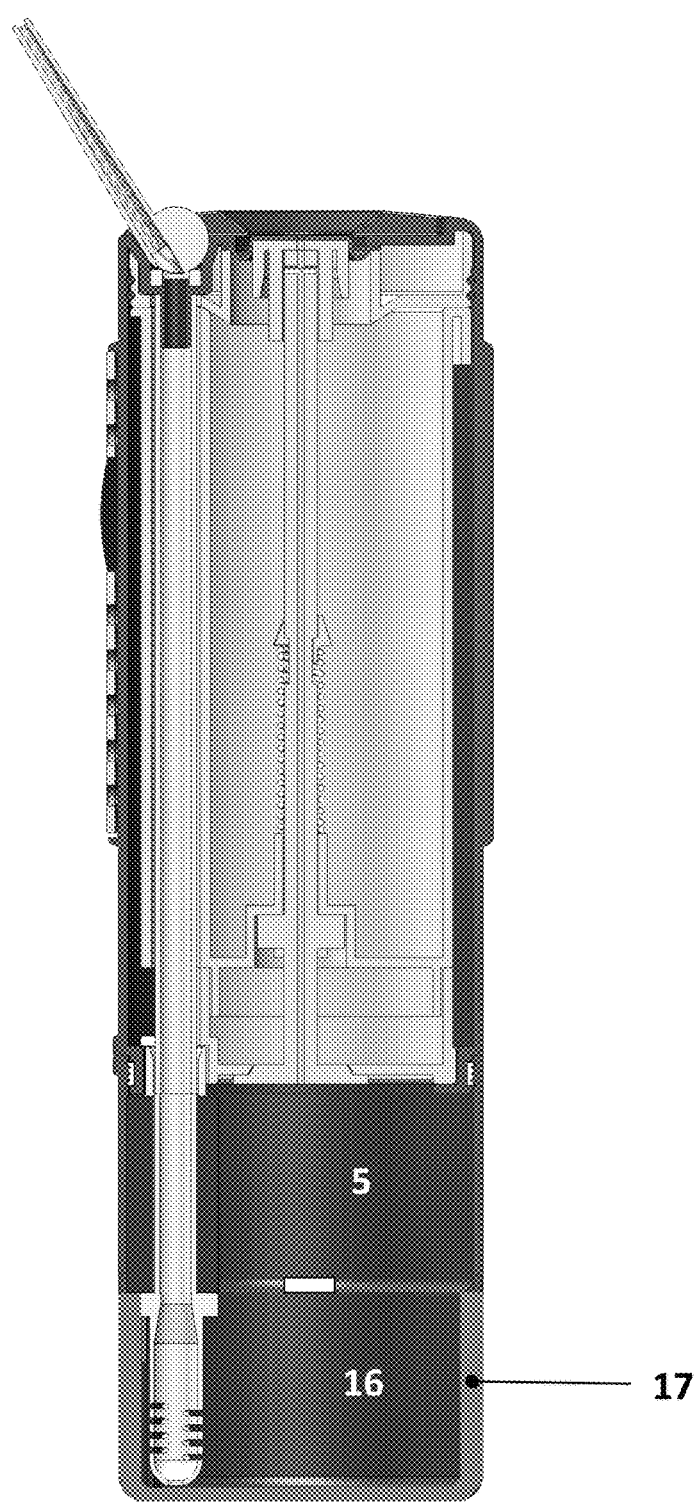
FIG. 11 is a cutaway perspective view of a further modified embodiment with an alternative cooling system.

Other embodiments of the invention, like that shown in FIG. 11, may cool each portion of beverage after brewing in a connected cooling chamber 16, which may either be directly exposed to the ambient air, or provided with a PCM compartment 17 which in turn might be exposed to ambient air.

The range of possible shapes, sizes and configurations of the cooling chamber is as broad and limitless as the variations described previously for beverage tube 6 and PCM compartment 7, and includes, but is not limited to, latticework channels, parallel planar fins, and the simple cup shape depicted. A user-actuated valve between brewing cup 5 and cooling chamber 16 may be deployed. After each dose of tea has been cooled in cooling chamber 16, the user can sip it out through the simple filter and beverage tube as with any simple straw.

Where the capacity for internal, multi-steep brewing is not required, some embodiments of this invention will work as a unique cooling travel mug for hot beverages that have already been made. Quite simply, a consumer could take any one of the embodiments depicted in FIGS. 1-10, omit adding tea leaves to brewing cup 5, fill water tank 1 with readymade hot tea, coffee or cocoa, and then cool and drink the beverage. Other embodiments strictly dedicated to non-brewing travel-mug service, and based on the cooling model illustrated in FIG. 11, could simply eliminate brewing cup 5 from the design and deploy cooling chamber 16 with PCM compartment 17 directly below the beverage tank and dosing valve.

In alternative embodiments, an electrical heating element may be incorporated to heat water to brewing temperature. In embodiments, the PCB and other components may be located in a watertight band around the underside of the top of the device. A heating element attached to the underside of the top of the device could project downward into water tank 1. In an embodiment, the heating element may be structured and positioned so as to operate both as heating element and valve rod 4.

In embodiments, a heating element may be powered by connection to a car cigarette lighter socket, wall outlet, or internal battery.

Buttons or other mechanisms for selecting the desired water temperature could also be deployed on the exterior of the device. In a preferred embodiment, all electrical components may be located on a single part (e.g., the device top), leaving all other parts of the electrical and non-electrical versions of the device interchangeable. Such a configuration may increase efficiency and reduce manufacturing cost.

Other electronic components may be incorporated. For example, an LED display on the exterior of the device could signal water temperature and system status. Wireless connectivity such as Wi-Fi or Bluetooth cold similarly be incorporated to provide information to a remote device such as a smartphone or a dash-mounted display in a vehicle.

While all embodiments illustrated and described here have involved a mouthpiece as the final delivery system, this invention encompasses embodiments with beverage channels that terminate in standard drinking holes in the cap, or other commonly known means.

It will be understood that any of the elements and/or exemplary embodiments of the disclosure described can be rearranged, separated, and/or combined without deviating from the scope of the disclosure. For ease, various elements are described, at times, separately. This is merely for ease and is in no way meant to be a limitation.

While the various steps, elements, and/or exemplary embodiments of the disclosure have been outlined above, it is evident that many alternatives, modifications and variations will be apparent to those skilled in the art. The various steps, elements, and/or exemplary embodiments of the disclosure, as set forth above, are intended to be illustrative, not limiting. Various changes may be made without departing from the spirit and scope of the disclosure. Accordingly, the spirit and scope of the present disclosure is to be construed broadly and not limited by the foregoing specification.

I claim:
1. A travel mug, comprising:
an outer wall portion and inner wall portion defining a container for holding a liquid;
a beverage channel at least partially position between the outer wall portion and inner wall portion for communicating fluid to the exterior of the device;
a cooling mechanism adjacent a portion of said beverage channel configured to reduce the temperature of portions of the said fluid prior to consumption; and means for communicating the cooled brewed product from the beverage channel to the exterior of the container.

2. The travel mug of claim 1 wherein said cooling mechanism further comprises a ventilation channel.

3. The travel mug of claim 1 wherein said beverage channel is configured to increase the area for heat transfer.

4. The travel mug of claim 1 wherein said beverage channel is positioned adjacent at least one compartment containing heat-absorbing material.

5. The travel mug of claim 1 further comprising a heating element for heating said liquid, wherein said heating element is powered by one of: an internal battery, an AC power source, and a DC power source.

6. The travel mug of 1 further comprising a valve positioned within said container and dividing said container into a beverage tank and a collecting or cooling chamber portion of beverage channel.

7. The travel mug of claim 6 wherein said valve is a dosing valve that is configured to dispense a set quantity of liquid into said beverage channel.

8. The travel mug of claim 1 wherein at least a portion of said cooling mechanism is detachable.

9. The travel mug of claim 1 further comprising a mechanism for retaining beverage in said beverage channel during cooling.

10. The travel mug of claim 1 wherein said beverage channel functions as a cooling mechanism.

11. A method of using a travel mug comprising:
providing the device of claim 1;
filling said water tank with liquid;
passing portions of said liquid through said beverage channel adjacent said cooling system; and
communicating said portions of liquid to the exterior of the device.

12. A travel mug as set forth in claim 1, further comprising:
a brewing section configured to hold an amount of brewing material.

13. The travel mug of claim 12 wherein said cooling mechanism further comprises a ventilation channel.

14. The travel mug of claim 12 wherein said beverage channel is configured to increase the area for heat transfer.

15. The travel mug of claim 12 wherein said beverage channel is positioned adjacent at least one compartment containing heat-absorbing material.

16. The travel mug of claim 12 further comprising a valve positioned within said container and dividing said container into a liquid section and a brewing section.

17. The travel mug of claim 16 wherein said valve is a dosing valve that is configured to dispense a set quantity of liquid into said brewing section.

18. The travel mug of claim 12 wherein at least a portion of said cooling mechanism is detachable.

19. The travel mug of claim 12 further comprising a mechanism for retaining beverage in said beverage channel during cooling.

20. The travel mug of claim 12 wherein said beverage channel functions as a cooling mechanism.

21. A method of brewing a beverage comprising:
providing the device of claim 12;
loading liquid into said liquid compartment;
loading brewing material into said material compartment;
causing said liquid and brewing material to contact each other so as to generate a brewed product;
causing said brewed product to interact with said cooling means or mechanism to reduce the temperature of the brewed product;
communicating said cooled brewed product to the exterior of the device.

* * * * *